United States Patent
Barton et al.

(10) Patent No.: US 10,706,846 B1
(45) Date of Patent: Jul. 7, 2020

(54) QUESTION ANSWERING FOR A VOICE USER INTERFACE

(71) Applicant: Amazon Technologies, Inc., Seattle, WA (US)

(72) Inventors: William Folwell Barton, Concord, MA (US); Raluca Teodora Stoain, Cambridge, MA (US); James Alfed Cuff, Medway, MA (US); Matthew Aaron Cember, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 15/911,987

(22) Filed: Mar. 5, 2018

Related U.S. Application Data

(60) Provisional application No. 62/616,988, filed on Jan. 12, 2018.

(51) Int. Cl.
| | | |
|---|---|---|
| *G10L 15/22* | (2006.01) | |
| *G10L 15/18* | (2013.01) | |
| *G10L 15/06* | (2013.01) | |
| *G10L 15/04* | (2013.01) | |
| *G10L 13/04* | (2013.01) | |

(52) U.S. Cl.
CPC ............ *G10L 15/22* (2013.01); *G10L 13/043* (2013.01); *G10L 15/063* (2013.01); *G10L 15/1815* (2013.01); *G10L 2015/223* (2013.01)

(58) Field of Classification Search
CPC ...... G10L 15/22; G10L 13/043; G10L 15/063; G10L 15/1815; G10L 2015/223
See application file for complete search history.

(56) References Cited

U.S. PATENT DOCUMENTS

| 8,468,143 | B1* | 6/2013 | Oztekin | ............ | G06Q 30/0281 |
| | | | | | 707/706 |
| 8,817,969 | B1* | 8/2014 | Chou | ...................... | H04M 3/00 |
| | | | | | 379/201.02 |
| 8,996,509 | B1* | 3/2015 | Sundaram | ........... | G06F 16/9535 |
| | | | | | 707/722 |
| 2004/0158618 | A1* | 8/2004 | Shaw | ................ | H04W 72/0493 |
| | | | | | 709/217 |
| 2013/0304758 | A1* | 11/2013 | Gruber | ................ | G06F 16/9535 |
| | | | | | 707/769 |
| 2014/0365327 | A1* | 12/2014 | Crossan | ................ | G06Q 30/08 |
| | | | | | 705/26.4 |
| 2016/0180237 | A1* | 6/2016 | Ahuja | .................... | G06N 5/022 |
| | | | | | 706/52 |

* cited by examiner

*Primary Examiner* — Sonia L Gay
(74) *Attorney, Agent, or Firm* — Price Atwood LLP

(57) ABSTRACT

Techniques for receiving user input and soliciting responses from one or more users are described. A user may speak a question to a system. The system may determine that various question and answering content sources cannot provide an answer to the question. The system may then store data representing the question in a dedicated storage. The system may a topic, to which the question relates and provide the question to users having knowledge on the topic.

20 Claims, 11 Drawing Sheets

FIG. 1
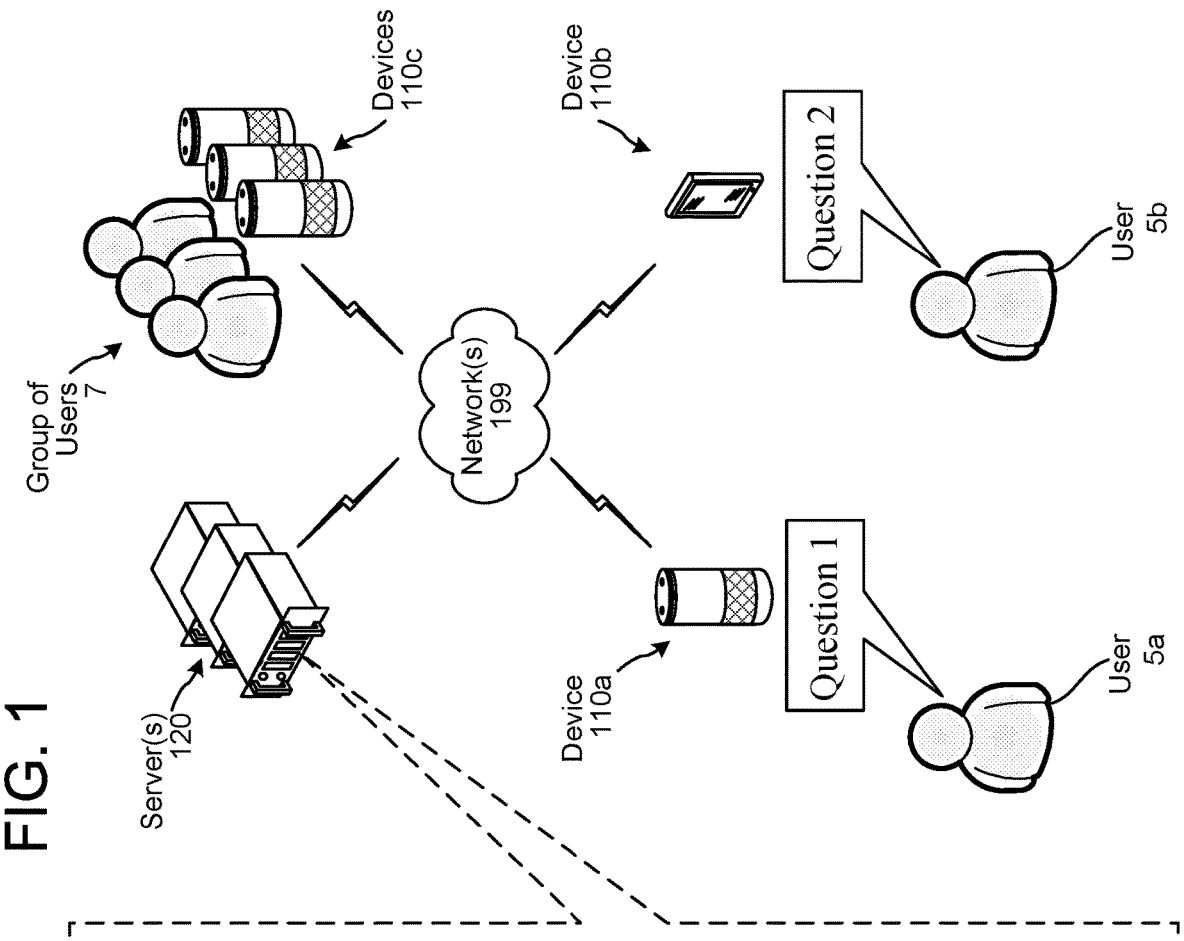
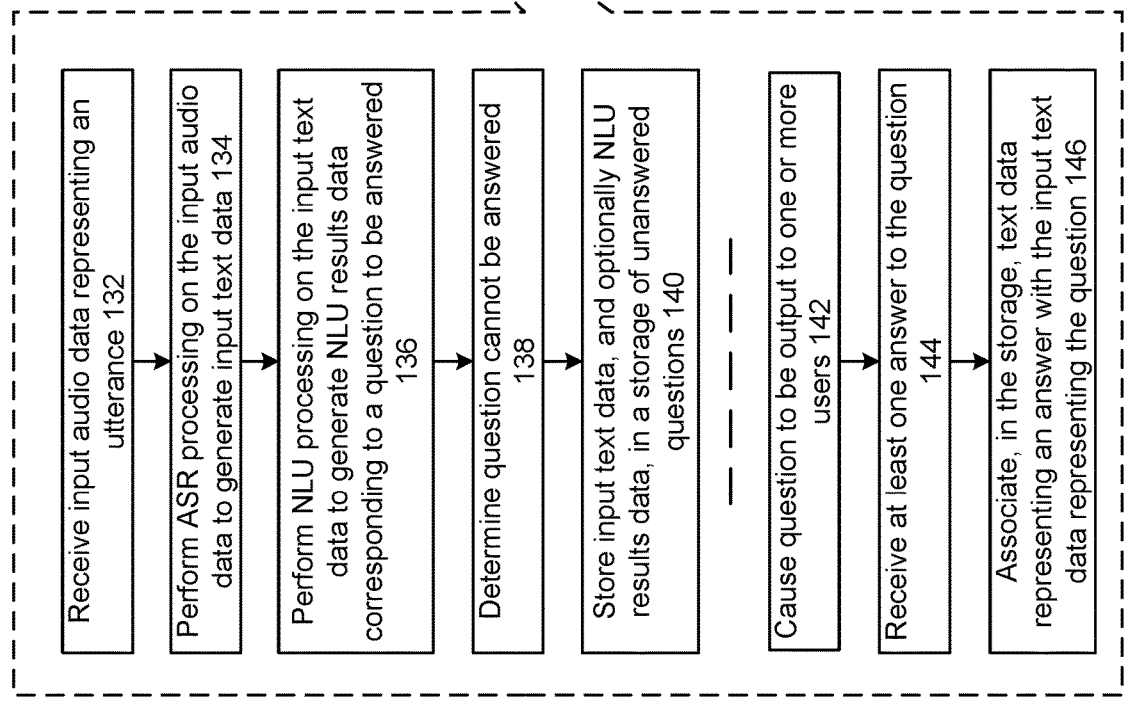

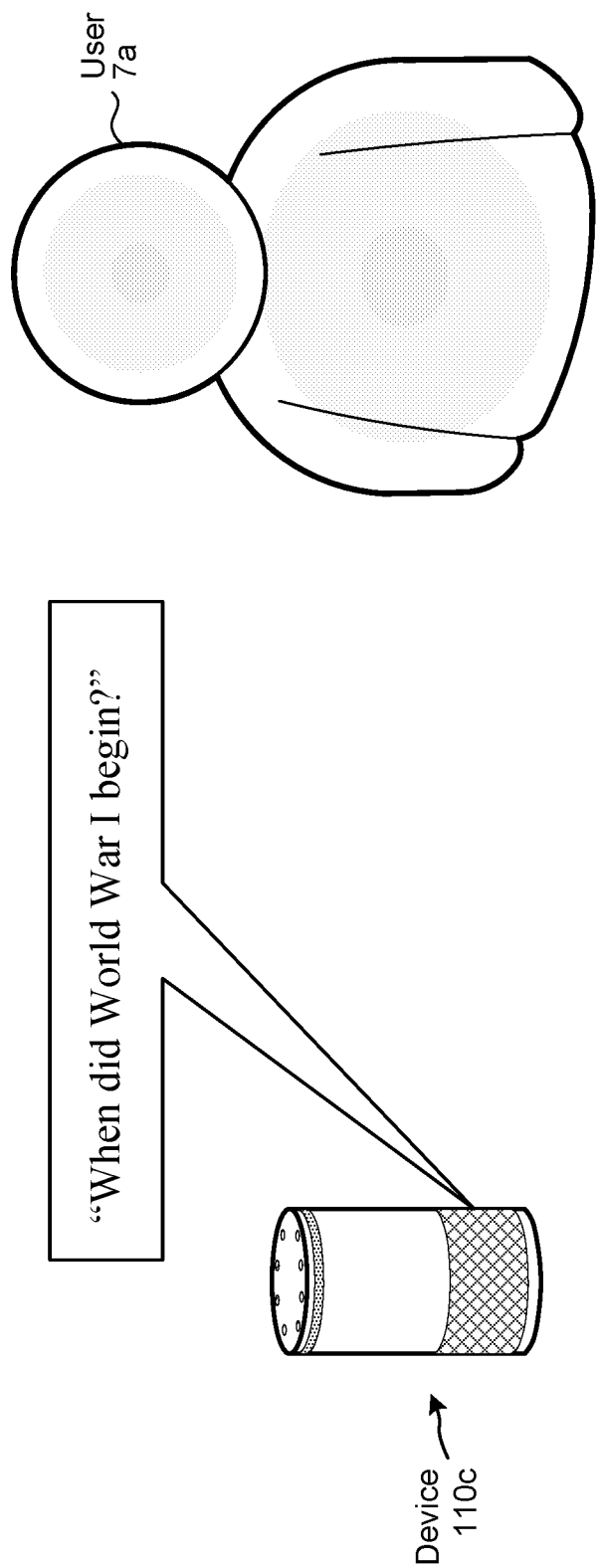

FIG. 7

| User ID | Initial Ranking |
|---------|-----------------|
| 12345   | Trusted         |
| 23456   | Blocked         |
| 34567   | Contender       |
| 45678   | Contender       |

US 10,706,846 B1

QUESTION ANSWERING FOR A VOICE USER INTERFACE

CROSS-REFERENCE TO RELATED APPLICATIONS

This application claims the benefit of priority to U.S. Provisional Patent Application 62/616,988, filed Jan. 12, 2018, entitled QUESTION ANSWERING FOR A VOICE USER INTERFACE, in the names of William Folwell Barton, et al., the contents of which is expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of a computing device to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to answer groupings of user questions according to embodiments of the present disclosure.

FIG. 3A illustrates the presentment of a list of failed questions to a user according to embodiments of the present disclosure.

FIG. 3B illustrates the presentment of a failed question(s) to a user according to embodiments of the present disclosure.

FIG. 7 illustrates user IDs associated with initial rankings according to embodiments of the present disclosure.

DETAILED DESCRIPTION

Figure 2:
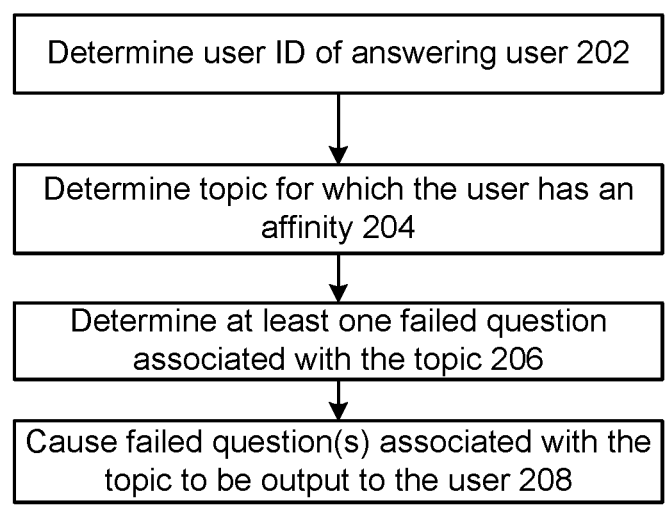
FIG. 2 is a flow diagram illustrating a method for determining which failed questions to present to a particular user for answer according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

ASR and NLU can be computationally expensive. That is, significant computing resources may be needed to perform ASR and NLU processing within a reasonable time frame. Because of this, a distributed computing environment may be used when performing speech processing. An example of such a distributed environment may involve a device having one or more microphones being configured to capture sounds from a user speaking and circuitry configured to convert those sounds into an audio signal. The audio signal/data may then be sent to a downstream remote device for further processing, such as for converting the audio signal into an ultimate command. The command may then be executed by a remote and/or (the) local device(s) depending on the command itself.

In certain situations, a user utterance may include a question to be answered by the system. That is, the user may ask the system to provide some information in response to the utterance. The ultimate command in this example would be to provide the information requested.

A system may include one or more information services that attempt to determine an answer to a user question. One information service may use a knowledge base storing facts organized in a particular manner that may be used to respond to a user input query. Such a knowledge base may be curated to include facts that have been checked or verified in some manner. Another information service may perform web querying, where a search string is input into a search engine and the information returned by the search engine used to respond to a user query. A further information service may use storage of question/answer pairs (or other information), with the information being provided by users of the system. The user-provided information may be organized in a variety of different ways and may also be used to respond to a user input query.

In some instances, none of the system's information services may be able to provide a response to a user's question. Such a question may be labeled as a "failed question." A question may be considered a failed question if the system is unable to determine an answer to the question with a sufficient confidence (such as a confidence exceeding a threshold). The system may include storage including data representing various failed questions received from one or more users.

The system may periodically attempt to answer failed questions. For example, the system may attempt to answer failed questions once a day, once a week, once a month, or the like. Attempting to answer all failed questions may become too computationally expensive as the number of failed questions grows, which may be at a rapid pace depending on the number of users of the system.

Offered is a system that groups failed questions (for example, by topic) and attempts to answer one or more resulting "failed topics." Such groupings may be helpful in obtaining answers to different questions, such as different forms of the same failed question (which may be asked by multiple different users) that are calling for the same ultimate answer. A first user may ask "where is Seattle," a second user may ask "where is Seattle," and a third user may ask "where is Seattle in the United States." The system may determine each of the foregoing questions is a failed question and may store each of the questions separately in storage dedicated to failed questions. If the system performs processing on the stored questions, the system may determine the stored questions are asking for the same piece of information. Thereafter, the system need not attempt to separately find the answer to each of the questions. Instead, the system may attempt to answer a single representation of the questions, which effectively answers each of the questions.

A system implementing the present disclosure may require user permission to perform the teachings herein. That is, a system may require a user opt in, with informed consent, prior to the system being able to implement the teachings herein with respect to the user.

FIG. 1 illustrates a system configured to answer groupings of user questions. Although the figures and discussion of the present disclosure illustrate certain operational steps of the system in a particular order, the steps described may be performed in a different order (as well as certain steps removed or added) without departing from the intent of the disclosure. Devices (110a/110b) local to a users (5a/5b), a group of devices 110c local to a group of users 7, and one or more server(s) 120 may communicate across one or more networks 199. Multiple users (5a/5b) may speak questions to respective devices (110a/110b), which may send audio data representing the speech to the server(s) 120, which the server(s) 120 receives (132). The server(s) 120 performs (134) ASR processing on the input audio data to generate input text data.

Alternatively, the device 110b may receive input from user 5b corresponding to text via a touch screen providing a virtual keyboard. The device 110b may generate input text data corresponding to the input text. The device 110b may send the input text data to the server(s) 120 via a companion application operating on the device 110b and in communication with the server(s) 120.

The server(s) 120 performs (136) NLU processing on the input text data (either generated by ASR processing or received from the device 110b) to generate NLU results data corresponding to a question to be answered. The server(s) 120 then determines (138) the question cannot be answered using the data available to the server(s) 120. In an example, the server(s) 120 may receive data corresponding to an answer from a source. The data may be associated with a confidence score representing the source's confidence that the answer is correct with respect to the question. The server(s) 120 may determine the provided answer does not represent an answer to the question (for purposes of providing the received data to a user) based on the confidence score being below a threshold confidence score. The server(s) 120 thereafter stores (140) the input text data, and optionally the NLU results data, in a storage including data representing unanswered questions.

Sometime thereafter the server(s) 120 causes (142) the question to be output to one or more users (represented as the group of users 7). For example, the server(s) 120 may cause one or more of the user devices 110c to present text representing the question and optionally other questions related to the same topic (e.g., related to World War II as illustrated in FIG. 3A). For further example, the server(s) 120 may cause one or more of the user devices 110c to output audio representing the question (as illustrated in FIG. 3B).

The server(s) 120 receives (144) at least one answer to the question. Since the question may be output to more than one user of the group of users 7, more than one user of the group of users 7 may provide an answer to the question. A device of the group of devices 110c may receive spoken input (corresponding to an answer to the question) of a respective user of the group of users 7. Alternatively, a device of the group of devices 110c may receive a text input (corresponding to an answer to the question) of a respective user of the group of users 7.

The server(s) 120 associates (146), in the storage, text data representing an answer with the text data representing the question. If only one user of the group of users 7 provides an answer, the text data representing the question may be associated with text data representing that answer. If multiple users of the group of users 7 provide answers, the text data representing the question may be associated with various text data representing the answers provided by the different users of the group of users 7.

A system according to the present disclosure may crowd-source answers to failed questions. FIG. 2 illustrates a technique for determining which failed questions to present to a particular user for answer.

The server(s) 120 determines (202) a user ID of an answering user. A user (of the group of users 7) may interact with their device to indicate an interest to answer at least one failed question. For example, the user may say "Alexa, tell me a question you want answered." Alternatively, the user may provide such an indication by interacting with failed question answering functionality presented in a companion application implemented on their device 110. The server(s) 120 may perform user recognition processing with respect to the user's speech to determine a user ID associated with the user that originated the speech. Alternatively, the server(s) 120 may determine a user ID associated with a device ID associated with the device 110 that originated the indication that the user wants to answer one or more questions.

The server(s) 120 also determines (204) a topic for which the user has an affinity. The server(s) 120 may maintain a record of the user's system usage. The server(s) 120 may process the user's system usage history to determine one or more topics the user's input relates to. For example, the user's system usage history may represent the user routinely asks the system questions about World War II. The server(s) 120 may determine a user has an affinity for a topic that the user has asked the system questions about at least a threshold number of times. The server(s) 120 may perform this processing after it receives an indication that the user wants to answer one or more questions. Alternatively, the server(s) 120 may perform this processing periodically (e.g., once a week, once a month, etc.). By performing such processing periodically, the system may be able to decrease a time between when the user indicates s/he wants to answer at least one question and a time when at least one question is output to the user.

The server(s) 120 determines (206) at least one failed question associated with the topic. Although the server(s)

120 may not be able to answer a question, the server(s) 120 may nonetheless be able to determine a topic of the question. For example, the server(s) 120 may perform NLU processing (as described herein) to tag portions of text data representing a user input. Such tags may correspond to various types of information (e.g., an object for which an action is requested). The server(s) 120 may use the tagged text data to determine a topic of the question. The server(s) 120 may then associate, in storage, text data (corresponding to or otherwise representing the topic) with the text data representing the corresponding failed question. Thus, once the server(s) 120 determines the topic for which the user has an affinity, the server(s) 120 may determine the stored failed questions associated with the topic.

The server(s) 120 causes (208) one or more of the failed questions associated with the topic to be output to the user. As illustrated in FIG. 3A, the server(s) 120 may send text data corresponding to the failed question(s) to a device 110 and the device 110 may present a list of text corresponding to the failed questions. The list of text may represent all failed questions the server(s) 120 determines are associated with the topic. Alternatively, the list of text may present up to a threshold number of failed questions to prevent the user from being overwhelmed by a potentially excessive amount of failed questions associated with the topic.

The text data the server(s) 120 sends to the device 110 may correspond to exactly how the failed question was input to the system. Thus, the list of failed questions presented for answering may include different variants of the same failed question as different users may speak the same question to the system differently.

Alternatively, as illustrated in FIG. 3B, the server(s) 120 may send audio data corresponding to the failed question(s) to a device 110 and the device 110 may output audio corresponding to the failed question(s). If the device 110 receives audio data corresponding to more than one failed question, the device 110 may cause audio representing one failed question be output, receive a spoken answer to the output failed question, and output synthesized speech asking the user 7a whether the user 7a wants to answer another failed question. If the user 7a responds negatively, the device 110 may not output further audio representing a further failed question. Alternatively, if the user 7a indicates they want to answer another failed question, the device 110 outputs further audio representing a further failed question. This sequencing of outputting audio representing a failed question, receiving a spoken answer, querying the user 7a whether they want to answer a further failed question, and proceeding according to the user's response may be performed as long as the user 7a wants to continue answering additional failed questions.

The failed questions presented to a user for answering may represent only questions related to objects or topics known to be of interest to the user. A user's interest or potential knowledge may be determined from data about the user. Such data may include, for example, the user's demographic information, employment information, family information, data representing the user's previous system usage, or other information. For example, a determination of a user's potential knowledge/interest may be premised on the assumption that the more a user engages the system regarding a particular object or topic, the more interest the user has in the object or topic. The system may determine an identity of a user, process the data in the storage to determine objects or topics of interest to the user, and then provide a failed questions associated with the objects or topics.

As described with respect to FIG. 2, a user may provide the system with an answer to a failed question that the system outputs to the user. Alternatively, a user may simply provide content to the system (e.g., via speech or text input) and request the system store the content. For example, a user may say "Alexa, remember that John Smith was born in Seattle." In response to receiving the spoken content, the system may store text data, corresponding to the spoken content, in a question and answer storage as detailed below.

A user may be paid for each answer the user provides and/or a subset of the answers provided. For example, a user may be paid for answers that are ultimately added to the system's knowledge base.

The system may maintain a record of which user spoke which failed question. An indication of a user (such as a user ID) may be associated with a given failed question in the storage (which may include failed questions from various users of the system). When the server(s) 120 receives user input, it may determine a user ID using user recognition techniques described herein or other techniques. When the server(s) 120 determines the user input corresponds to a failed question (as described herein), the server(s) 120 may associate data representing the failed question and the user ID in the storage of failed questions.

When the system receives an answer to a failed question as described with respect to FIG. 2, the system may determine a user that originated the failed question and may send the answer to the user. Alternatively, the system may send a notification to the user that an answer is now known. The notification may take various forms. For example, the notification may be embodied as a text or audio message, part of flash news briefing, or some other notification format. Moreover, the notification may be presented at certain times, for example after the user's first interaction with the system after the answer is determined, after the user's first interaction with the system the calendar day after the answer is determined, or some other time. User preferences may dictate when and/or how an answer to a failed question is presented to a user. For example, the system may determine a user ID associated with a failed question that is now answered, and determine user profile data, associated with the user ID, represents notifications should only be output to the user in the morning, in the afternoon, with respect to the user's first interaction with the system on the calendar day, etc. Moreover, the system may implement parameters (e.g., number of follow-up answers delivered to a user over the last N amount of time) in order to prevent the system from spamming the user with follow-up answers to failed questions.

The notification may be appended to an answer to a question corresponding to a related topic or object. For example, the user may initially ask the system "where do the Seahawks play" and the system may not be able to determine an answer, resulting in the question being labeled a failed question by the system and stored appropriately. After the system is able to determine an answer to the failed question, the user may ask the system "what is a large city in Washington?" The server(s) 120 may determine the failed question of "where do the Seahawks play" is related to the later question of "what is a large city in Washington" due to the answer to both being "Seattle." Thus, when the system outputs the answer to the question of "what is a large city in Washington," the system may also output content representing the failed question and the corresponding answer (e.g., "Seattle is a large city in Washington and is also where the Seahawks play, in response to your earlier question.").

Figure 4:
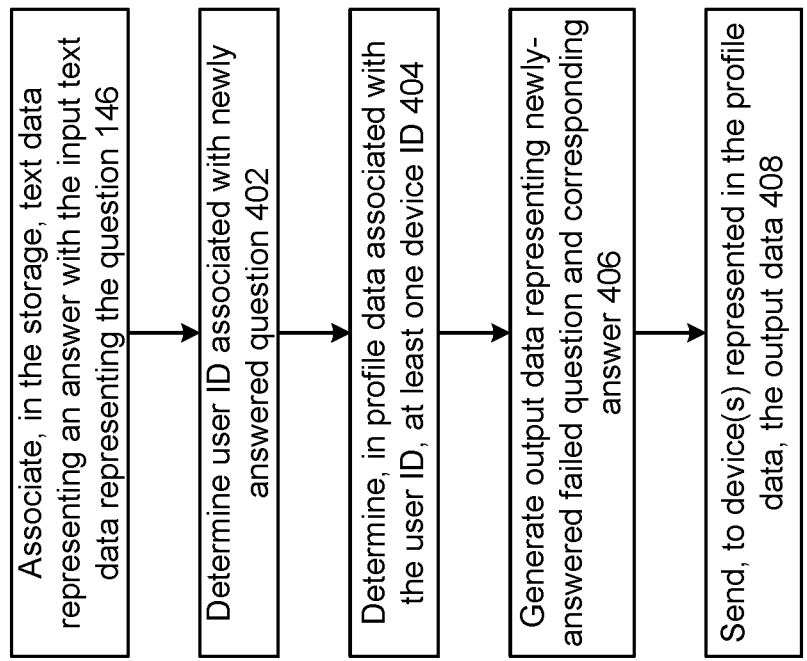
FIG. 4 is a flow diagram illustrating a method for notifying a user that originated a failed question when an answer becomes available according to embodiments of the present disclosure.

FIG. 4 illustrates a method for notifying a user that originated a failed question when an answer becomes available. After the server(s) 120 associates (146) text data corresponding to an answer with text data representing the failed question, the server(s) 120 determines (402) a user ID (or other identifier) associated with the text data representing the failed question. Thus, when the text data representing the failed question is stored, the server(s) 120 may associate, in the storage, a user ID (associated with a user (5a/5b) that originated the failed question) with the text data representing the failed question. The server(s) 120 determines (404), in profile data associated with the user ID in a user profile storage 570 described herein, at least one device ID representing at least one device. The server(s) 120 generates (406) output data representing the newly-answered failed question and its corresponding answer. The server(s) 120 sends (408) the output data to at least one device associated with the at least one device ID represented in the user profile data associated with the user ID. Depending on the situation, the output data may be text data and/or audio data that is output to a user as text or audio as illustrated in FIGS. 3A and 3B, respectively.

The server(s) 120 may also or alternatively associate, in the storage, text data representing a failed question with a device ID representing the device 110 from which the failed question originated. Thus, once a failed question is answered, the server(s) 120 may determine a device ID associated with the newly answered question, generate (406) output data representing the newly-answered failed question and corresponding answer, and send (408) the output data to the device 110 associated with the device ID.

As described with respect to FIG. 4, a user may provide the system with an answer to a failed question. The system may alternatively determine an answer to a failed question using a question and answer (Q&A) service 565 described below. For example, after the failed question a failed question is determined, the Q&A service 565 may receive data from a data source that enables the Q&A service 565 to now answer the failed question. The Q&A service 565 may periodically reevaluate failed questions to determine if the failed questions can be answered using the data available to the system. The reevaluation process may involve computer processing as if the failed question was currently received by the system as user input (as described herein). Reevaluation of failed questions may be performed in the background so users do not experience any latency due to such reevaluation. The system may implement a time threshold such that the system may only reevaluate failed questions that were received within a past time threshold (e.g., within the past year, six months, two weeks, etc.). Implementing a time threshold allows the system to decrease processing of failed questions that are no longer relevant to users. The process for notifying a user that their previously failed question can now be answered, as described with respect to FIG. 4, may be performed when the system later determines an answer to a failed question without receiving a user provided answer to the failed question.

The system may limit the failed questions it reevaluates based on various criteria. For example, the system may include logic that enables the system to determine failed questions including personal information or offensive topics. The system may restrict reevaluation to failed questions that do not include personal information or offensive topics.

Figure 5:
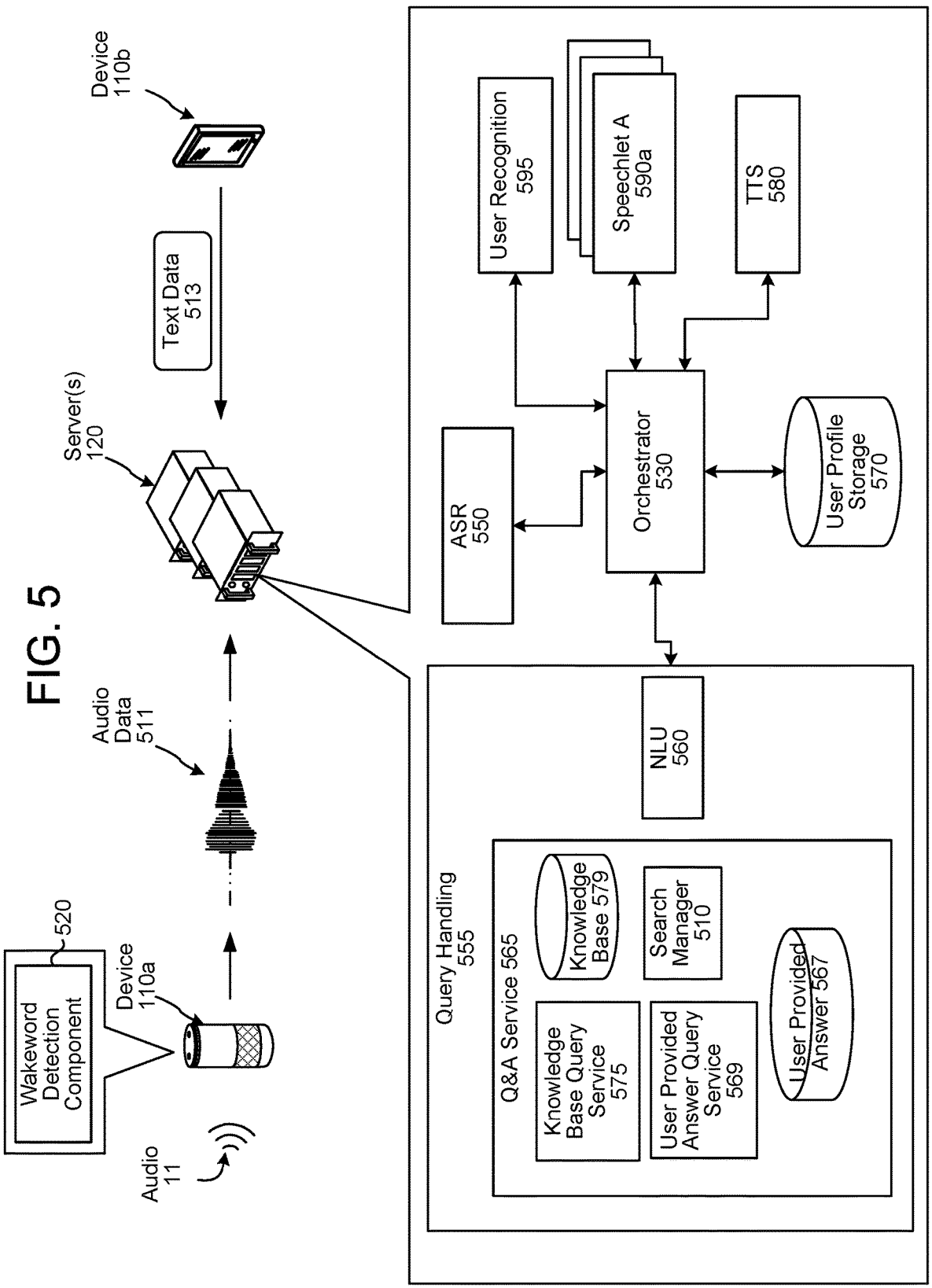
FIG. 5 is a conceptual diagram for processing user input according to embodiments of the present disclosure.

FIG. 5 is a conceptual diagram of how user input may be processed, allowing a system to capture and execute commands input by a user, such as spoken commands that may follow a wakeword. The various components illustrated in FIG. 5 may be located on a same or different physical devices. Communication between various components illustrated in FIG. 5 may occur directly or across one or more networks 199. An audio capture component, such as a microphone of the device 110a, captures audio 11. The device 110a, using a wakeword detection component 520, processes the audio 11, or audio data representing to the audio, to determine if a keyword (such as a wakeword) is detected in the audio 11. Following detection of a wakeword, the device 110a sends audio data 511, corresponding to an utterance represented in the audio 11 or corresponding audio data, to the server(s) 120. The audio data 511 may be output from an acoustic front end (AFE) located on the device 110a. Or the audio data 511 may be in a different form for processing by a remote AFE, such as one located with an ASR component 550 of the server(s) 120.

The wakeword detection component 520 works in conjunction with other components of the device 110a, for example a microphone (not illustrated) to detect keywords in the audio 11. For example, the device 110a may convert the audio 11 into audio data, and process the audio data with the wakeword detection component 520 to determine whether speech is detected, and if so, if the audio data comprising speech matches an audio signature and/or model corresponding to a particular keyword.

The device 110a may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other embodiments, the device 110a may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11 received by the device 110a, the device 110a may use the wakeword detection component 520 to perform wakeword detection to determine when a user intends to speak a command to the device 110a. This process may also be referred to as keyword detection, with the wakeword being a specific example of a keyword. Specifically, keyword detection is typically performed without performing linguistic analysis, textual analysis, or semantic analysis. Instead, the audio 11 (or audio data corresponding to the audio 11) is analyzed to determine if specific characteristics of the audio 11 (or audio data) match preconfigured acoustic waveforms, audio signatures, or other data to determine if the audio 11 (or audio data) "matches" stored audio data corresponding to a keyword.

Thus, the wakeword detection component 520 may compare audio data to stored models or data to detect a wakeword. One approach for wakeword detection applies general large vocabulary continuous speech recognition (LVCSR) systems to decode audio signals, with wakeword searching conducted in the resulting lattices or confusion networks.

LVCSR decoding may require relatively high computational resources. Another approach for wakeword spotting builds HMMs for each wakeword word and non-wakeword speech signals, respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment, the wakeword detection component 520 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 511, corresponding to the audio 11, to the server(s) 120 for speech processing. The audio data 511 may be sent to the server(s) 120 for routing to a recipient device or may be sent to the server(s) 120 for speech processing for interpretation of the speech (either for purposes of enabling voice-communications and/or for purposes of executing a command in the speech). The audio data 511 may include data corresponding to the wakeword, or the portion of the audio data 511 corresponding to the wakeword may be removed by the device 110a prior to sending the audio data 511 to the server(s) 120.

Upon receipt by the server(s) 120, the input audio data 511 may be sent to an orchestrator component 530. The orchestrator component 530 may include memory and logic that enables the orchestrator component 530 to transmit various pieces and forms of data to various components of the system, as well as perform other operations as described herein.

The orchestrator component 530 sends the audio data 511 to an ASR component 550. The ASR component 550 transcribes the audio data 511 into text data. The text data output by the ASR component 550 represents one or more than one (e.g., in the form of an N-best list) hypotheses representing an utterance represented in the audio data 511. The ASR component 550 interprets the utterance in the audio data 511 based on a similarity between the audio data 511 and pre-established language models. For example, the ASR component 550 may compare the audio data 511 with models for sounds (e.g., subword units, such as phonemes, etc.) and sequences of sounds to identify words that match the sequence of sounds of the utterance represented in the audio data 511. The ASR component 550 sends the text data generated thereby to a query handling component 555, either directly or via the orchestrator component 530. The text data sent from the ASR component 550 to the query handling component 555 may include a top scoring hypothesis or may include an N-best list including multiple hypotheses. An N-best list may additionally include a respective score associated with each hypothesis represented therein. Each score may indicate a confidence of ASR processing performed to generate the hypothesis with which the score is associated.

Alternatively, the device 110b may send text data 513 to the server(s) 120. Upon receipt by the server(s) 120, the text data 513 may be sent to the orchestrator component 530. The orchestrator component 530 may send the text data 513 to the query handling component 555.

The query handling component 555 may attempt to process the text data (either generated by the ASR component 550 or output by the device 110b) in a number of ways. Those ways may be executed at least partially in parallel. The text data may be sent to a question and answer (Q&A) service component 565. At this point in time, the Q&A service component 565 assumes the text data corresponds to a request for information. As the Q&A service component 565 may operate at least partially in parallel to a NLU component 560, the Q&A service component 565 may not know if the text data actually corresponds to a request for information, but processing the text data at least partially in parallel between the NLU component 560 and Q&A service component 565 may result in reduced latency perceived by a user.

The text data may be sent to a knowledge base query service 575 which may work in conjunction with a structured knowledge base 579 to attempt to obtain information responsive to the text data. The knowledge base 579 may include a collection of tuples or otherwise semantically (or otherwise) encoded data that can be queried to obtain information. In such a knowledge base 579, certain knowledge bases or information stores may store information in a "tuple" format, where entities are joined together in pairs, triplets, or the like, that define the relationship between two things. For example, a tuple such as [John Doe, husband of, Jane Doe] may describe that John Doe is Jane Doe's husband. Many such tuples may exist in a knowledge base and may be usable to answer user inputs. For example, the above tuple may be used to answer a question such as "who is Jane Doe's husband," "who is John Doe married to," or the like. One example of such a knowledge base 579 is Amazon's EVI knowledge base.

One drawback to a tuple-based approach, or other knowledge base that may store information in a limited format, is that it may be difficult for the system to infer knowledge between different tuples. For example, if other tuples existed such as [John Doe, date of marriage, 2002] and [Jake Doe, brother of, John Doe], a tuple-based system may not be able to answer a question such as "when did John Doe become the brother-in-law of Jane Doe" as the system would need to traverse and link several tuples regarding the various relationships and dates to obtain the needed information. Such processing would be difficult for a tuple based system.

In another structured knowledge base, information may be stored in a form representative of a knowledge graph, which may comprise a directed acyclic graph (DAG) which graphs nodes representing entities (e.g., people, places, things) connected by vertices or links where each link corresponds to a relationship. To answer questions about particular entities in a knowledge graph, the system may traverse a path along the knowledge graph from one entity to another and track the information along the traversed links to obtain information about how one entity relates to another. For example, a DAG may include a node for Jane Doe, a node for John Doe, a node for Jake Doe, etc. A link between Jane Doe and John Doe may be associated with a variety of information such as "married in 2002," "met in 2000," etc. A link between John Doe and Jake Doe may be associated with information such as "brothers" or the like. Even if there is no direct link between the node for Jane Doe and the node for Jake Doe, the system may be able to determine a path between the two, and gather information along the vertices along that path (e.g., from Jane Doe to John Doe and then from John Doe to Jake Doe) to obtain information needed to answer the query "when did John Doe become the brother-in-law of Jane Doe."

The knowledge base may also include a schema (for example defined by classes and properties) to organize its data.

At least partially in parallel to the knowledge base query service 575 attempting to find an answer to the text data using the knowledge base 579, the Q&A service 565 may operate a search manager 510 to attempt to find an answer to the text data using an unstructured web search. The search manager 510 may input a search string into a search engine. The result for such a web query often takes the form of a list of Internet links rather than an answer to a specific question, and further web queries make no effort at any semantic understanding, relying instead on a solely keyword based search approach.

The Q&A service 565 may operate a user provided answer query service 569 at least partially in parallel to the knowledge base query service 575 and/or the search manager 579. The user provided answer query service 569 may work in conjunction with a user provided answer storage 567 to attempt to obtain information responsive to the text data. The user provided answer storage 567 may include question and answer pairs. The questions represented in the user provided answer storage 567 may correspond to "failed questions" as described herein. The answers represented in the user provided answer storage 567 may correspond to user provided answers to the failed questions. The answers may be provided by many different users of the system. The user provided answer query service 569 may use text finding techniques in attempting to obtain information, in the user provided answer storage 567, responsive to the text data.

At least partially in parallel to the operations of the Q&A service component 565, the system may process the text data using the NLU component 560. The NLU component 560 attempts to make a semantic interpretation of the phrases or statements represented in the text data input therein. That is, the NLU component 560 determines one or more meanings associated with the phrases or statements represented in the text data based on words represented in the text data. The NLU component 560 determines an intent representing an action that a user desires be performed as well as pieces of the text data that allow a device (e.g., the device 110*a*, the device 110*b*, the server(s) 120, a speechlet 590, a speechlet server(s) (not illustrated), etc.) to execute the intent. For example, if the text data corresponds to "play Adele music," the NLU component 560 may determine an intent that the system output Adele music and may identify "Adele" as an artist. For further example, if the text data corresponds to "what is the weather," the NLU component 560 may determine an intent that the system output weather information associated with a geographic location of the device 110. For yet further example, if the text data corresponds to "who is John Smith," the NLU component 560 may determine an intent that the system output information describing John Smith.

The output from the NLU component 560 (which may include tagged text data, indicators of intent, etc.) may then be sent to a speechlet(s) 590. A "speechlet" may be software running on the server(s) 120 that is akin to a software application running on a traditional computing device. That is, a speechlet 590 may enable the server(s) 120 to execute specific functionality in order to provide data or produce some other requested output. The server(s) 120 may be configured with more than one speechlet 590. For example, a weather service speechlet may enable the server(s) 120 to provide weather information, a car service speechlet may enable the server(s) 120 to book a trip with respect to a taxi or ride sharing service, an order pizza speechlet may enable the server(s) 120 to order a pizza with respect to a restaurant's online ordering system, a communications speechlet may enable the system to perform messaging or multi-endpoint communications, a Q&A speechlet may enable the server(s) 120 to provide various Q&A information, etc. A speechlet 590 may operate in conjunction between the server(s) 120 and other devices such as a device 110 in order to complete certain functions. Inputs to a speechlet 590 may come from speech processing interactions or through other interactions or input sources.

A speechlet 590 may include hardware, software, firmware, or the like that may be dedicated to a particular speechlet 590 or shared among different speechlets 590. A speechlet 590 may be part of the server(s) 120 (as illustrated in FIG. 5) or may be located at whole (or in part) with separate speechlet servers (not illustrated). A speechlet server(s) may communicate with a speechlet(s) 590 within the server(s) 120 and/or directly with the orchestrator component 530 or with other components. Unless expressly stated otherwise, reference to a speechlet, speechlet device, or speechlet component may include a speechlet component operating within the server(s) 120 (for example as speechlet 590) and/or speechlet component operating within a speechlet server(s).

A speechlet 590 may be configured to perform one or more actions. An ability to perform such action(s) may sometimes be referred to as a "skill." That is, a skill may enable a speechlet 590 to execute specific functionality in order to provide data or perform some other action requested by a user. A particular speechlet 590 may be configured to execute more than one skill/action. For example, a weather service skill may involve a weather speechlet providing weather information to the server(s) 120, a car service skill may involve a car service speechlet booking a trip with respect to a taxi or ride sharing service, an order pizza skill may involve a restaurant speechlet ordering a pizza with respect to a restaurant's online ordering system, etc.

A speechlet 590 may be in communication with one or more speechlet servers implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

If the NLU output represents a Q&A speechlet, the NLU output may be sent to the Q&A speechlet (which is represented as the Q&A service in FIG. 5). The Q&A service 565 then attempts to determine an answer to a question represented in the received NLU output. The Q&A service 565 may cause some or all of its components to execute. For example, if none of the Q&A service's components determined, in parallel to NLU processing, an answer with respect to ASR output text data, all of the Q&A service's components may be caused to execute with respect to the NLU output. Alternatively, for example, if some of the Q&A service's components determined, in parallel to NLU processing, an answer with respect to ASR output text data, the Q&A service 565 may cause only those components, that did not already determine an answer, to execute with respect to the NLU output.

In certain instances, a speechlet 590 may output data in a form suitable for output to a user (e.g., via a device 110). In other instances, a speechlet 590 may output data in a form unsuitable for output to a user. Such an instance includes a speechlet 590 providing text data while audio data is suitable for output to a user.

The server(s) 120 may include a TTS component 580 that generates audio data from text data using one or more different methods. The audio data generated by the TTS component 580 may then be output by a device 110 as synthesized speech. In one method of synthesis called unit selection, the TTS component 580 matches text data against a database of recorded speech. The TTS component 580 selects matching units of recorded speech and concatenates the units together to form audio data. In another method of synthesis called parametric synthesis, the TTS component 580 varies parameters such as frequency, volume, and noise to create audio data including an artificial speech waveform. Parametric synthesis uses a computerized voice generator, sometimes called a vocoder.

The server(s) 120 may include a user profile storage 570. The user profile storage 570 may include a variety of information related to individual users, groups of users, etc. that interact with the system. The user profile storage 570 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may additionally include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 570 is implemented as part of the server(s) 120. However, one skilled in the art will appreciate that the user profile storage 570 may be in communication with the server(s) 120, for example over the network(s) 199.

The server(s) 120 may include a user recognition component 595. The user recognition component 595 may take as input the audio data 511, text data 513, and/or text data output by the ASR component 550. The user recognition component 595 determines scores indicating whether user input originated from a particular user. For example, a first score may indicate a likelihood that the user input originated from a first user, a second score may indicate a likelihood that the user input originated from a second user, etc. The user recognition component 595 also determines an overall confidence regarding the accuracy of user recognition operations. The user recognition component 595 may perform user recognition by comparing audio characteristics in the audio data 511 to stored audio characteristics of users. The user recognition component 595 may also perform user recognition by comparing biometric data (e.g., fingerprint data, iris data, etc.) received by the system in correlation with the present user input to stored biometric data of users. The user recognition component 595 may further perform user recognition by comparing image data (e.g., including a representation of at least a feature of a user) received by the system in correlation with the present user input with stored image data (e.g., including representations of features of users). The user recognition component 595 may perform additional user recognition processes, including those known in the art. Output of the user recognition component 595 may include a single user ID corresponding to the most likely user that originated the current input. Alternatively, output of the user recognition component 595 may include an N-best list of user IDs with respective scores indicating likelihoods of respective users originating the current input. The output of the user recognition component 595 may be used to inform NLU processing, Q&A service 565 processing, as well as processing performed by speechlets 590.

As described with respect to FIG. 5, the Q&A service 565 may include various components that use different types of question and answering techniques to determine an answer to a user input (either in parallel with NLU processing and potentially thereafter). The number of components that user different types of question and answering techniques may differentiate depending on the system. More than one of the components of the Q&A service 565 may determine an answer to a single user input question.

Figure 6:
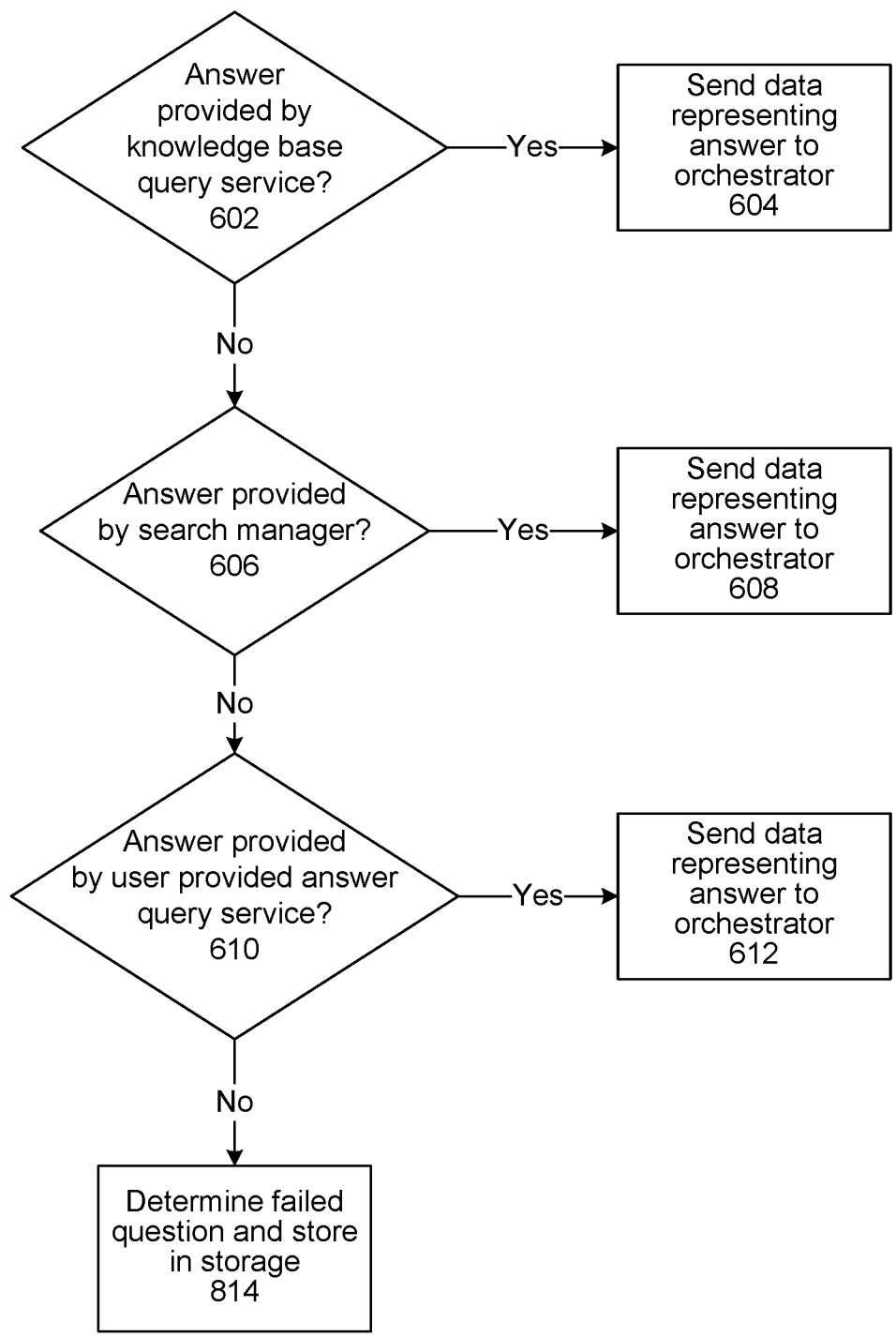
FIG. 6 is a flow diagram illustrating a priority based manner in which an answer is determined for output to a user according to embodiments of the present disclosure.
Figure 8:
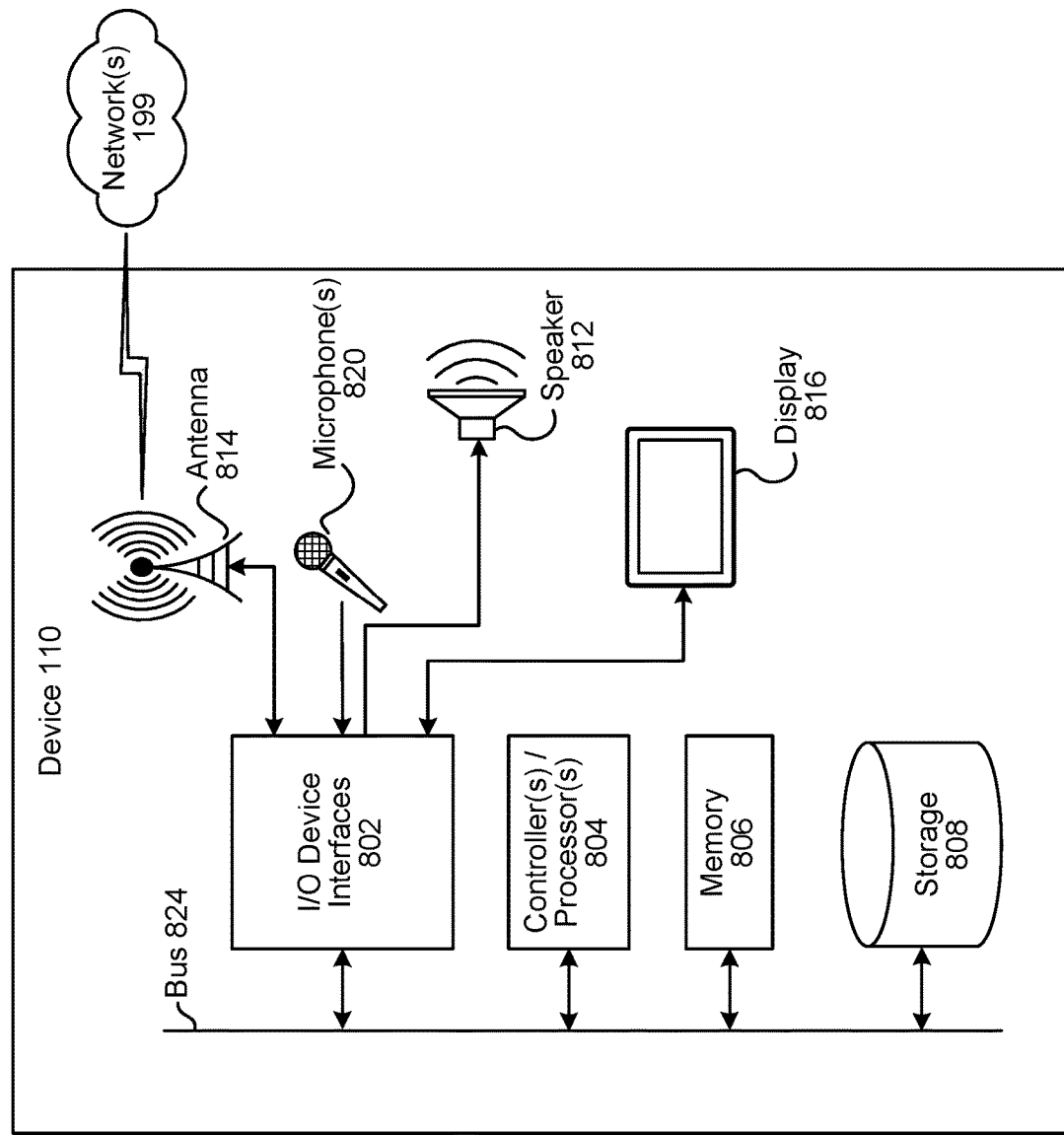
FIG. 8 is a block diagram conceptually illustrating example components of a device according to embodiments of the present disclosure.

FIG. 6 illustrates a priority based manner in which the Q&A service 565 determines which answer to output to a user. Each component of the Q&A service 565 may be assigned a priority and the Q&A service 565 may select the answer provided by the highest priority component as the answer to output to a user. In an example, the knowledge base query service 575 may have a higher priority than the search manager 510 which may in turn have a higher priority than the user provided answer query service 569. As illustrated in FIG. 8, the Q&A service 565 may determine (602) whether the knowledge base query service 575 provided an answer to the present user query. If the knowledge query service 575 provided an answer, the Q&A service 565 may send (604) data representing the answer to the orchestrator component 530. If the knowledge base query service 575 did not provide an answer, the Q&A service 565 may determine (606) whether the search manager 510 provided an answer to the present user query. If the search manager 510 provided an answer, the Q&A service 565 may send (608) data representing the answer to the orchestrator component 530. If the search manager 510 did not provide an answer, the Q&A service 565 may determine (610) whether the user provided answer query service 569 provided an answer to the present user query. If the user provided answer query service 569 provided an answer, the Q&A service 565 may send (612) data representing the answer to the orchestrator component 530. If the user provided answer query service 569 did not provide an answer, the Q&A service 565 may determine (614) store data representing the present user query in storage dedicated to failed questions. The orchestrator component 530 may (if necessary) facilitate conversion of the data representing an answer into a format suitable for output to a user and cause the data to be output by a device 110.

While FIG. 6 illustrates the Q&A service 565 as having three components that user different question and answering techniques (e.g., a knowledge base query service, a search manager, a user provided answer query service), one skilled in the art will appreciate that these components are merely illustrative and that a Q&A service 565 may include more or less components than those described above.

The components of the Q&A service 565 may operate in parallel. Thus, the processes described with respect to FIG. 6 may be performed after the Q&A service 565 receives data from each of its components to ensure the highest priority answer is chosen even if a higher priority component processes slower than a lower priority component.

The system may be configured to provide a user with an answer the system has the highest confidence in. To ensure a highest confidence answer is output, component priority (as described with respect to FIG. 6) may simply be a factor in determining which answer should be output to a user for a particular question. For example, the Q&A service 565 may also consider a component's confidence in their respective answer, the topic of the question (as some components may be better suited to answer questions with respect to particular topics than other components), etc. By considering various data points in determining which answer to output, the system may determine the best source for an answer on an answer-by-answer basis, topic-by-topic basis, and the like. Moreover, rather than the Q&A service 565 performing the foregoing dynamic selection, the Q&A service 565 may provide data (e.g., whether a component provided an answer and the component's confidence in the answer) to a ranker located elsewhere, for example in the orchestrator component 530. The Q&A service 565 and/or the ranker of the orchestrator component 530 may implement a deep neural network to perform ranking of answers.

The Q&A service 565 may query all of its components with respect to each question.

Alternatively, the Q&A service 565 may selectively choose which component(s) thereof to query with respect to a particular question. For example, if the Q&A service 565 receives data representing a topic or object of a question, the Q&A service 565 may selectively query one or more components that are appropriately suited to answer the question.

As described, the user provided answer storage 567 may include user provided answers to failed questions. It may be beneficial for the system to rank user provided answers and only output answers that satisfy some confidence threshold. This enables the system to mitigate situations in which a user provides an incorrect answer to a failed question and the system then outputs the incorrect answer in response to a subsequent user input query.

The system may associate a user with an initial ranking based on various data, such as whether the user is a paying customer of the system or whether the user only uses free services provided by the system, how long the user has been a user of the system, how often the user uses the system, as well as other data that lends itself to user trustworthiness. The initial ranking may be a categorical ranking, such as trusted, contender, or blocked. FIG. 7 illustrates user IDs associated with various initial rankings. Alternatively, the initial ranking may be a continuum (e.g., from 0-1 (with 0 being blocked and 1 being trusted) or some other scale).

The system may adjust the ranking of a user over time. For example, a user may provide answers to multiple failed questions. Other users of the system may also provide answers to the same failed questions. If a user's provided answers correspond to other users' provided answers a threshold amount of times, the user's ranking may be increased (e.g., from blocked to contender, from contender to trusted, or from one value to another if the ranking is a continuum). Conversely, if a user's provided answers deviate from other users' provided answers a threshold amount of times, the user's ranking may be decreased (e.g., from trusted to contender, from contender to blocked, or from one value to another if the ranking is a continuum). If a user is associated with a threshold amount of trusted answers, the user may be ranked as a trusted user, and vice versa.

The system may further re-rank a user based on feedback provided by an answer recipient user. For example, the system may output an answer corresponding to a user provided answer from the user provided answer storage 567. Once the answer is done being output, the system may solicit the answer receiving user regarding the correctness of the answer. The recipient user may then provide the system with a correctness of the answer (e.g., by speaking the correctness to a device 110). User provided correctness of answers may be considered by the system when re-ranking a user.

A single instance of user provided feedback may not be sufficient to cause a user's ranking to be adjusted. That is, the system may require a threshold amount of user provided feedback be received with respect to a particular user's provided answers in order for the system to adjust the user's ranking based on the user provided feedback.

The system may implement parameters such that a single answer-recipient user is only requested to provide feedback a certain number of times per a set amount of time. This helps prevent the system from spamming the user with feedback requests.

Similarly, the system may associate a user provided answer with an initial ranking when the answer is received by the system. The initial ranking assigned to an answer may correspond to the ranking of the user, that provided the answer, when the user provided the answer. For example, if a user is ranked as contender when the user provides an answer to a failed question, the answer may be initially assigned a ranking of contender. Therefore, like user rankings, the ranking of an answer may be a categorical ranking, such as trusted, contender, or blocked, or may be a continuum ranking (e.g., from 0-1 (with 0 being blocked and 1 being trusted) or some other scale).

The system may adjust the ranking of an answer over time. For example, a user may provide an answer to a failed question. Other users of the system may also provide answers to the same failed question. If a user's provided answer corresponds to other users' provided answers a threshold amount of times, the answer's ranking may be increased (e.g., from blocked to contender, from contender to trusted, or from one value to another if the ranking is a continuum). Conversely, if a user's provided answer deviates from other users' provided answers a threshold amount of times, the answer's ranking may be decreased (e.g., from trusted to contender, from contender to blocked, or from one value to another if the ranking is a continuum).

The system may further re-rank an answer based on feedback provided by an answer recipient user. For example, the system may output an answer corresponding to a user provided answer from the user provided answer storage 567. The answer may be provided to various recipient users of the system. Once the answer is done being output, the system may solicit the answer receiving user regarding the correctness of the answer. The recipient user may then provide the system with a correctness of the answer (e.g., by speaking the correctness to a device 110). Indications of an answer's correctness received from users of the system may be considered by the system when re-ranking an answer. For example, if an answer receives enough positive feedback from system users, the ranking of the answer may be increased, and vice versa.

A single instance of user provided feedback may not be sufficient to cause an answer's ranking to be adjusted. That is, the system may require a threshold amount of user provided feedback be received with respect to a particular answer in order for the system to adjust the answer's ranking based on the user provided feedback.

The Q&A service 565 may consider answer ranking when determining whether to output an answer provided by the user provided answer query service 569. The Q&A service 565 may be configured to output trusted answers more often than contender answers, and prevent blocked answers from being output. Moreover, the Q&A service 565 may determine not to output a contender answer until after a threshold number of users of the system have submitted similar answers to the same failed question (i.e., the failed question associated with the contender answer). Such allows the system to only output answers the system has sufficient confidence in, even if the answer is ranked less than trusted.

As detailed above, the Q&A service 565, or a ranker of the orchestrator component 530, may determine which answer to output based on various data. The Q&A service 565, or another ranker, may determine which answer to output based at least in part on the ranking of the answer.

Figure 9:
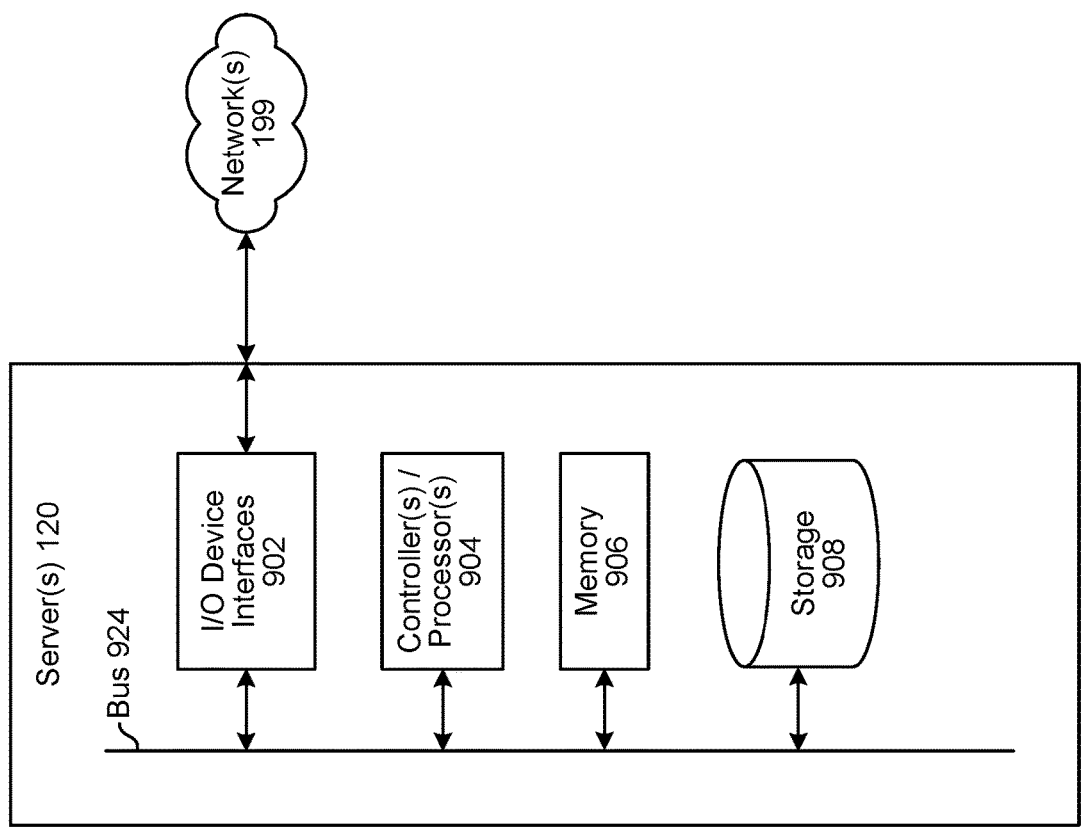
FIG. 9 is a block diagram conceptually illustrating example components of a server according to embodiments of the present disclosure.

FIG. 8 is a block diagram conceptually illustrating a device 110 that may be used with the system. FIG. 9 is a block diagram conceptually illustrating example components of a remote device, such as the server(s) 120, which may assist with ASR processing, NLU processing, etc. Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (1004/1104), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120) may also include a data storage component (808/908) for storing data and controller/processor-executable instructions. Each data storage component (808/908) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (802/902).

Computer instructions for operating each device (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (802/902), processor(s) (804/904), memory (806/906), and/or storage (808/908) of the device(s) 110 and server(s) 120, respectively. Thus, the ASR component 550 may have its own I/O interface(s), processor(s), memory, and/or storage; the NLU component 560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

Figure 10:
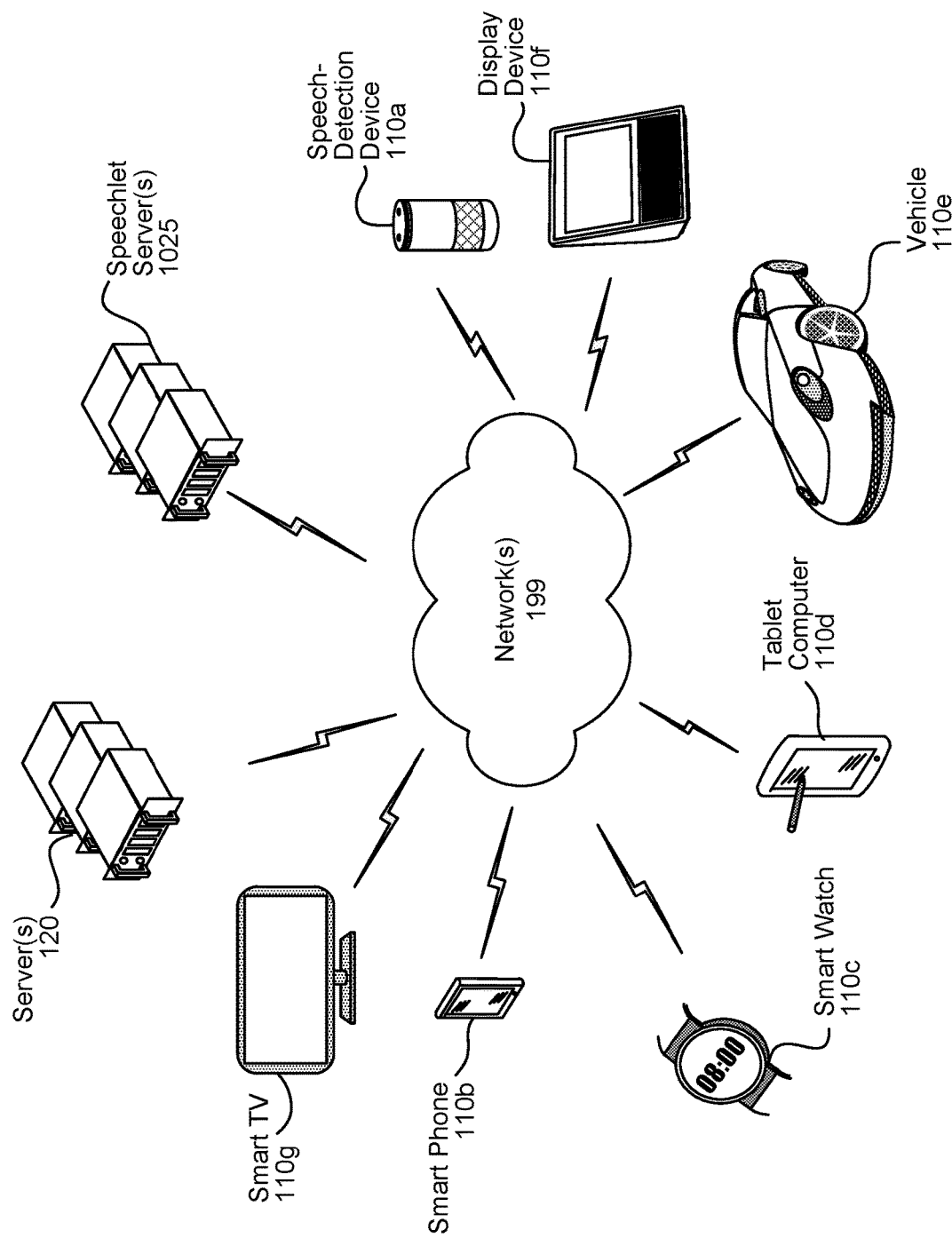
FIG. 10 illustrates an example of a computer network for use with the speech processing system.

As illustrated in FIG. 10, multiple devices (110a-110g, 120, 1025) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the speechlet server(s) 1025, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 550, the NLU component 560, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a first device, first audio data representing first speech corresponding to a first user question;
generating first text data representing the first user question;
processing the first text data to determine a first answer to the first user question is unknown;
after determining the first answer is unknown, storing the first user question text data in storage;
after storing the first user question in the storage, receiving, from a second device, second audio data representing second speech requesting a question without an answer be output;
determining a user identifier associated with the second audio data;
after receiving the second audio data, determining previously received user inputs associated with the user identifier;
determining at least a portion of the previously received user inputs corresponds to a topic;
determining the first user question corresponds to the topic; and
causing the second device to output the first user question.

2. The method of claim 1, further comprising:
causing the second device to request whether an additional answerable question is to be output;
receiving, from the second device, third audio data indicating a further answerable question is to be output;
determining, in the storage, a second user question corresponding to the topic; and
causing the second device to output the second user question.

3. The method of claim 1, further comprising:
receiving, from the second device, third audio data representing a second answer to the first user question; and
associating, in the storage, the first user question with the second answer.

4. The method of claim 3, further comprising:
determining the user identifier is associated with a first ranking representing a trustworthiness of received data associated with the user identifier;
associating, in the storage, the second answer with the first ranking;
determining the second answer is associated with a plurality of positive feedbacks;
determining the plurality of positive feedbacks satisfy a threshold amount of positive feedbacks; and
associating, in the storage, the second answer with a second ranking, the second ranking being greater than the first ranking.

5. A method, comprising:
receiving, from a first device, first data corresponding to a first user question;
determining a first answer to the first user question is unknown;
after determining the first answer is unknown, storing the first user question in storage;
after storing the first user question in the storage, receiving, from a second device, second data requesting a question without an answer be output;
determining a user identifier associated with the second data;
after receiving the second data, determining previously received user inputs associated with the user identifier;
determining at least a portion of the previously received user inputs corresponds to a topic;

determining the first user question corresponds to the topic; and causing the second device to output the first user question.

6. The method of claim 5, further comprising:

receiving, from the second device, third data representing a second answer to the first user question; and associating, in the storage, the first user question with the second answer.

7. The method of claim 5, wherein the storage comprises text data representing the first user question and wherein the method further comprises:

performing text-to-speech (TTS) processing on the text data to generate audio data; and causing the second device to output the audio data.

8. The method of claim 5, further comprising:

determining, in the storage, a second user question corresponding to the topic; and causing the second device to present the first user question and the second user question in a list of answerable questions.

9. The method of claim 5, further comprising:

causing the second device to request whether an additional answerable question is to be output;

receiving, from the second device, third data indicating a further answerable question is to be output;

determining, in the storage, a second user question corresponding to the topic; and causing the second device to output the second user question.

10. The method of claim 6, further comprising:

determining the user identifier is associated with a first ranking representing a trustworthiness of received data associated with the user identifier; and associating, in the storage, the second answer with the first ranking.

11. The method of claim 10, further comprising:

determining the second answer is associated with a plurality of positive feedbacks;

determining the plurality of positive feedbacks satisfy a threshold amount of positive feedbacks; and associating, in the storage, the second answer with a second ranking representing a trustworthiness of the second answer, the second ranking being greater than the first ranking.

12. The method of claim 10, further comprising:

determining the second answer is associated with a plurality of negative feedbacks;

determining the plurality of negative feedbacks satisfy a threshold amount of negative feedbacks; and associating, in the storage, the second answer with a second ranking representing a trustworthiness of the second answer, the second ranking being less than the first ranking.

13. A computing system, comprising:

at least one processor; and at least one memory comprising instructions that, when executed by the at least one processor, cause the system to:

receive, from a first device, first data corresponding to a first user question;

determine a first answer to the first user question is unknown;

after determining the first answer is unknown, store the first user question in storage;

after storing the first user question in the storage, receive, from a second device, second data requesting a question without an answer be output;

determine a user identifier associated with the second data;

after receiving the second data, determine previously received user inputs associated with the user identifier;

determine at least a portion of the previously received user inputs corresponds to a topic;

determine the first user question corresponds to the topic; and cause the second device to output the first user question.

14. The computing system of claim 13, wherein the at least one memory further comprises instructions that, when executed by the at least one processor, further cause the system to:

receive, from the second device, third data representing a second answer to the first user question; and associate, in the storage, the first user question with the second answer.

15. The computing system of claim 13, wherein the storage comprises text data representing the first user question and wherein the at least one memory further comprises instructions that, when executed by the at least one processor, further cause the system to:

perform text-to-speech (TTS) processing on the text data to generate audio data; and cause the second device to output the audio data.

16. The computing system of claim 13, wherein the at least one memory further comprises instructions that, when executed by the at least one processor, further cause the system to:

determine, in the storage, a second user question corresponding to the topic; and cause the second device to present the first user question and the second user question in a list of answerable questions.

17. The computing system of claim 13, wherein the at least one memory further comprises instructions that, when executed by the at least one processor, further cause the system to:

cause the second device to request whether an additional answerable question is to be output;

receive, from the second device, third data indicating a further answerable question is to be output;

determine, in the storage, a second user question corresponding to the topic; and cause the second device to output the second user question.

18. The computing system of claim 14, wherein the at least one memory further comprises instructions that, when executed by the at least one processor, further cause the system to:

determine the user identifier is associated with a first ranking representing a trustworthiness of received data associated with the user identifier; and associate, in the storage, the second answer with the first ranking.

19. The computing system of claim 18, wherein the at least one memory further comprises instructions that, when executed by the at least one processor, further cause the system to:

determine the second answer is associated with a plurality of positive feedbacks;

determine the plurality of positive feedbacks satisfy a threshold amount of positive feedbacks; and associate, in the storage, the second answer with a second ranking representing a trustworthiness of the second answer, the second ranking being greater than the first ranking.

20. The computing system of claim 18, wherein the at least one memory further comprises instructions that, when executed by the at least one processor, further cause the system to:
   determine the second answer is associated with a plurality of negative feedbacks;
   determine the plurality of negative feedbacks satisfy a threshold amount of negative feedbacks; and
   associate, in the storage, the second answer with a second ranking representing a trustworthiness of the second answer, the second ranking being less than the first ranking.

* * * * *